United States Patent [19]

Jeromson et al.

[11] Patent Number: 4,887,644
[45] Date of Patent: Dec. 19, 1989

[54] TEE FITTING INTEGRALLY FORMED IN VALVE BODY

[75] Inventors: Jeffrey T. Jeromson, Willoughby; Peter C. Williams, Cleveland Heights, both of Ohio

[73] Assignee: Whitey Co., Highland Heights, Ohio

[21] Appl. No.: 197,839

[22] Filed: May 24, 1988

[51] Int. Cl.$^4$ .............................................. F16K 5/00
[52] U.S. Cl. .................................. 137/876; 137/887; 251/148
[58] Field of Search ...................... 251/148, 152, 367; 137/876, 887

[56] References Cited

U.S. PATENT DOCUMENTS

| | | | |
|---|---|---|---|
| 190,772 | 5/1877 | Mansir | 251/148 |
| 715,425 | 12/1902 | Schamp | 251/148 |
| 750,582 | 1/1904 | Brennan | 251/148 |
| 3,894,718 | 7/1975 | Koch et al. | 251/148 |
| 3,954,251 | 5/1976 | Callahan, Jr. et al. | 251/148 |
| 3,981,482 | 9/1976 | Callahan, Jr. et al. | 251/152 |
| 4,403,626 | 9/1983 | Paul, Jr. | 137/887 |

*Primary Examiner*—Michael Chambers
*Attorney, Agent, or Firm*—Fay, Sharpe, Beall, Fagan, Minnich & McKee

[57] ABSTRACT

An end member of a valve body is provided with first, second, and third passages to define an integral tee fitting. Two of the passages are generally aligned for receipt in the flow path of a main processing line. The third passage extends generally perpendicular to the first and second passages and communicates with the valve chamber. The first and second passages also include threaded regions to facilitate interconnection with the main processing line.

21 Claims, 3 Drawing Sheets

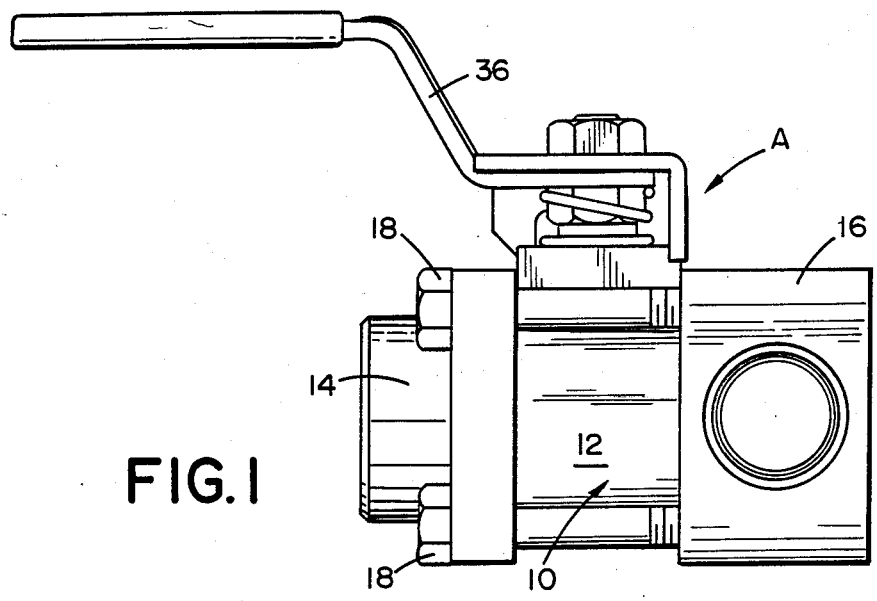
FIG. 1
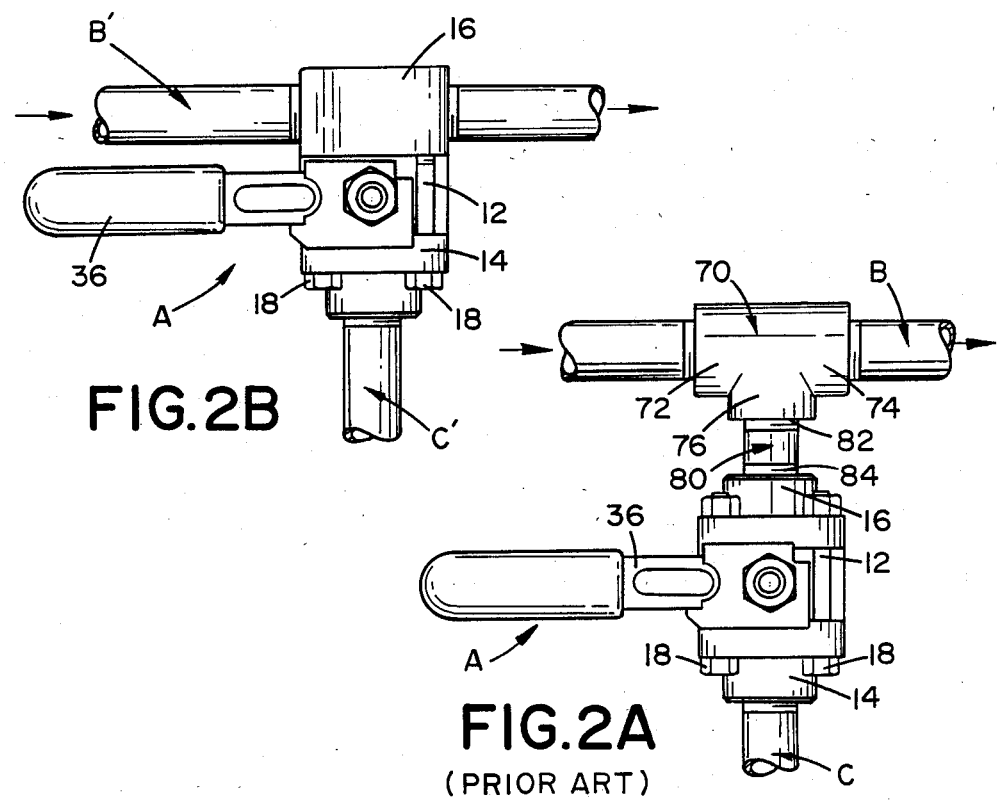
FIG. 2B
FIG. 2A (PRIOR ART)

TEE FITTING INTEGRALLY FORMED IN VALVE BODY

BACKGROUND OF THE INVENTION

This invention pertains to the art of interconnecting a fluid system device to a main process line and more particularly to eliminating a separate tee fitting and associated secondary line extending between the tee fitting and fluid system device.

The invention is particularly applicable to modifying an end member of a known valve body arrangement and will be described with particular reference to a ball valve housing. However, it will be appreciated that the invention has broader applications and may be utilized with similar fluid system devices.

Commonly assigned U.S. Pat. No. 3,981,482 to Callahan, Jr., et al. issued Sept. 21, 1976 is directed to a ball valve structure that has met with substantial commercial success. For purposes of brevity, the disclosure of that patent is hereby incorporated by reference. According to the structural arrangement of that patent, a three part valve body includes first and second end members received on opposite ends of a central body portion. A plurality of elongated tie members or bolts extend through selected portions of the three part body. Through removal of a predetermined tie bolt, the central body portion swings away or pivots relative to the opposed end members which are maintained fixed relative to one another by the remaining tie bolts. The valve body is still disposed in-line during the swing away action so that complete removal from a fluid line and disassembly of the valve body are avoided. This arrangement facilitates ease of servicing valve seats received in the central body portion on opposite sides of a ball member.

Although the detailed description in the noted patent is directed to a ball valve the disclosure recognizes that the same body portions, end members, and tie bolt relationships can be employed in many different fluid system devices. By way of example, filters, flow gauges, check valves, pinch valves, and the like can advantageously be designed to use the inventive body or housing arrangement.

Flow system devices of this type generally include a passage through each end member that facilitates makeup with an associated fluid system through conventional pipe connection means. For example, and as illustrated in the referenced patent, standard pipe threads may be provided in the passages as one means to facilitate ease of assembly of the fluid systems. Passages through the end members are generally aligned along a longitudinal axis so that the flow system device may be disposed in-line. To accommodate an in-line device of this type, at least four regions along the flow path must be sealed to the external environment. Particularly, (i) the juncture between the fluid line and the inlet passage of one end member, (ii) the interface between the inlet end member and the central valve body portion, (iii) the interface between the central valve body portion and the outlet end member, and (iv) the interconnection between the outlet end member and the fluid line all define regions that must be sealed. The patented structure is deemed to reliably seal these various interface regions.

In order to incorporate a fluid system device of this type in a secondary line and interconnect a main process line, it heretofore has been necessary to include a conventional tee fitting in the main process line. Typically, the straight flow path of the tee fitting is aligned with the main process line and a generally perpendicular access passage of the tee fitting is connected to the secondary line. A small length of fluid line is, therefore, positioned between the tee fitting and the fluid system device to interconnect the body with the main process line. Two connections between the main process line and the tee fitting result and an additional interconnection is required between the tee fitting and the secondary line. Essentially, a shortened length of secondary fluid line extends between the tee fitting and the fluid system device, thus increasing the space required to accommodate all of the various components. Since space is at a premium in many fluid environments, it has been deemed desirable to eliminate the shortened portion of secondary line between the fluid system device and tee fitting.

Additionally, it is always deemed desirable to limit the number of junctions in a fluid system. The time necessary to complete the connections and the components required to complete the connections can add considerable cost to the fluid system. Therefore, eliminating unnecessary junctions can result in significant economic benefits. The subject invention accomplishes all of these goals and overcomes the shortcomings of prior arrangements by decreasing the number of connections, providing ease of assembly; and reducing assembly and repair time.

SUMMARY OF THE INVENTION

According to the present invention, there is provided a new body arrangement incorporating a tee fitting construction therein.

According to a more limited aspect of the invention, the body includes a central body portion and first and second end members retained by securing means. One of the end members includes a first passage communicating with a chamber in the central body portion and a second passage disposed generally perpendicular to and communicating with the first passage for communication with an associated fluid line.

According to a more limited aspect of the invention, a third passage is defined in the selected end member and is disposed generally colinear with the second passage for defining a tee junction.

According to yet another aspect of the invention, the second and third passages include means for connecting said end member to an associated fluid process line.

Still other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof, and wherein:

FIG. 1 is a side elevational view of a ball valve incorporating the subject invention;

FIG. 2A is a top plan view illustrating connection of a prior art ball valve received in a secondary line to a main process line;

FIG. 2B is a top plan view illustrating connection of the ball valve of FIG. 1 to a secondary line and to a main process line;

DETAILED DESCRIPTION OF THE PREFERRED EMBODIMENT

Figure 3:
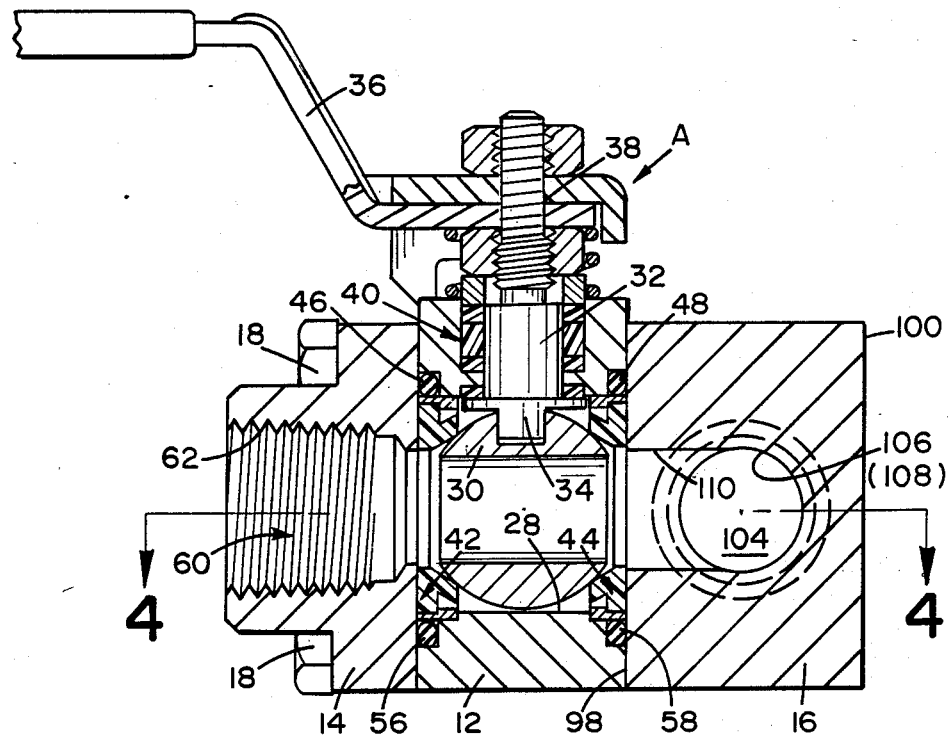
FIG. 3 is a longitudinal cross-sectional view of a ball valve of FIG. 1 incorporating the subject invention.
Figure 4:
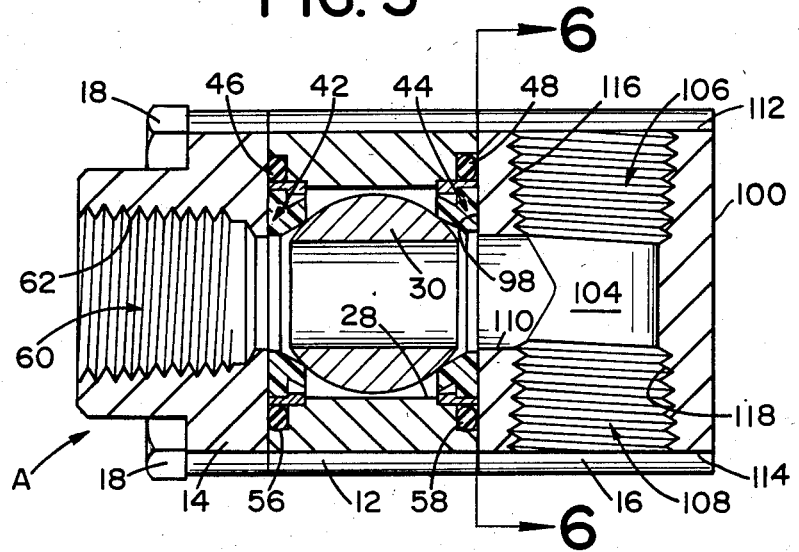
FIG. 4 is a cross-sectional view generally along the lines 4—4 of FIG. 3.

Referring now to the drawings wherein the showings are for purposes of illustrating the preferred embodiment of the invention only and not for purposes of limiting same, the FIGURES show a valve A such as a ball valve or the like disposed adjacent a main process line B. In the particular arrangement under consideration, the valve is disposed in a secondary line C of a fluid system.

As more particularly illustrated in FIG. 1, the valve A includes a three part valve body 10 having a central body portion 12 disposed between first and second end members 14, 16. Means for securing the end members to opposite ends of the body portion is defined by plural tie bolts 18. One of the bolts extends through the central body portion to provide a pivotal arrangement. The remaining three tie bolts extend along an external surface of the central body portion and axially compress the end members into sealing engagement therewith.

With reference to FIG. 3, the central body portion 12 includes a cavity or valve chamber 28 that receives a valve member such as ball member 30 therein. An actuating stem 32 has a lower end 34 that operatively engages the ball member. A handle 36 is secured to an outer end 38 of the stem to facilitate selective rotation of the ball member between open and closed positions. A conventional stem packing assembly 40 is disposed axially along the actuating stem. Upstream and downstream seat assemblies 42, 44 are disposed in the valve chamber for sealingly engaging peripheral portions of the ball member. Additionally, upstream and downstream seal members such as O-rings 46, 48 are received in respective grooves 56, 58 of the central body portion to provide a fluid tight seal between the central body portion and end members. The ball valve as described to this point is already known in the art and further structural details are set forth in U.S Pat. No. 3,981,482.

According to the preferred embodiment of the subject invention, the first end member 14 includes an inlet passage 60 that communicates with the valve chamber 28. Means for connecting the end member to an associated fluid line such as threaded region 62 is provided. Again, this structural arrangement is conventionally used in the art. The second end member 16, though, is of modified construction. Specifically, the second end member eliminates a tee fitting as is illustrated with particular reference to FIG. 2A. As shown therein, the main process line B is joined to a secondary fluid line C through use of tee fitting 70. The tee fitting has three branches having respective passages 72, 74, 76. The first and second passages 72, 74 are generally axially aligned to define a continuous flow path with the main process line. The third passage 76 extends generally perpendicular to the first and second passages in a manner that is well known in the art.

Figure 5:
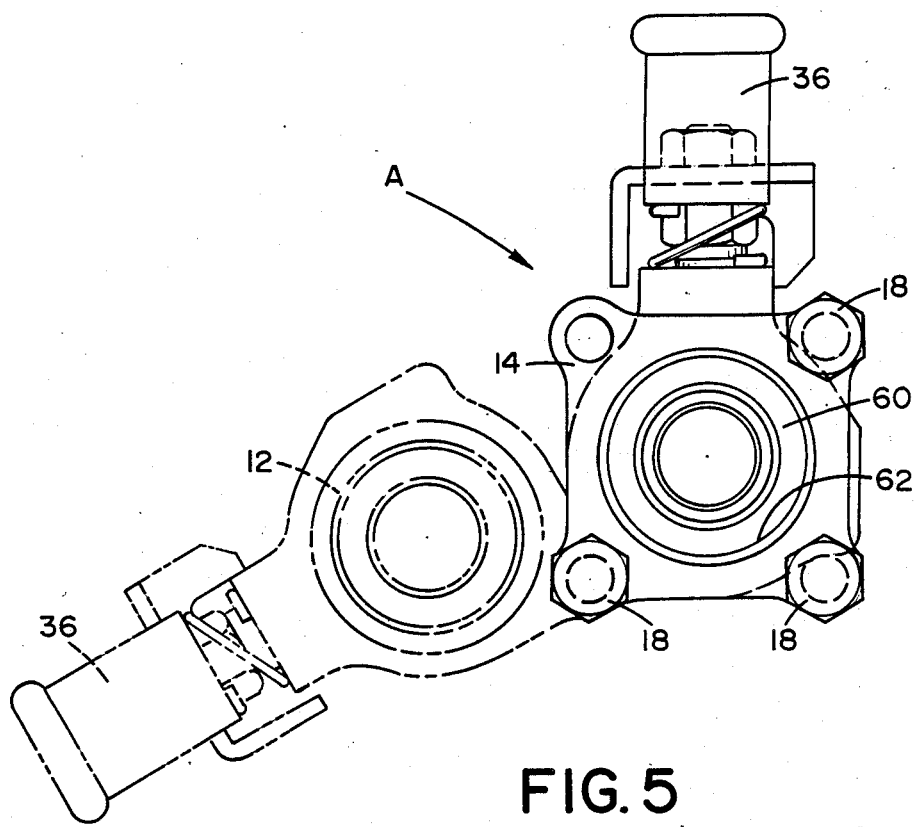
FIG. 5 is an end view taken generally from the left-hand side of FIG. 1 with the swing-out feature of a central body portion shown in phantom; and, FIG. 6 is a view taken generally along the lines 6—6 of FIG. 4.

An intermediate fluid line 80 has a first end 82 connected to the third passage of the tee fitting. A second end 84 of the intermediate fluid line is secured to an end member of a conventional valve. For purposes of discussion, this end member is referred to as the outlet end member. As illustrated, the valve A has a three part body that provides for a swing-away feature (FIG. 5) as taught in the noted U.S. Pat. No. 3,981,482. The inlet end member of the valve is secured to the secondary line C to complete connection of the secondary line to the main process line B. Fluid can then be added to or received from the process line through selective opening and closing of the valve A.

Figure 6:
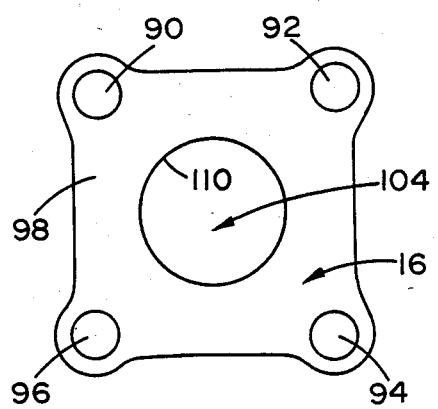

In FIG. 2B, the subject new valve body with integrally formed tee fitting is shown connecting a secondary line to a main process line. For ease of illustration and discussion, like elements are identified by like numerals with a primed (') suffix. As is apparent, incorporation of new end member 16' into the valve body eliminates the tee fitting 70 and intermediate fluid line 80 from the fluid system. With additional reference to FIGS. 1, 3, and 6, the second end member 16 is illustrated in greater detail. It includes first, second, third, and fourth threaded apertures 90, 92, 94, 96 that extend axially from a generally planar inner face 98. According to a preferred arrangement, the apertures 90, 92, 94, 96 terminate within the end member, i.e., short of the solid external wall or face 100. The threaded apertures receive respective tie bolts 18 that extend from the first end member and tightly secure the first and second end members to opposite ends of the central body portion. Of course, those skilled in the art will recognize that other arrangements may be utilized without departing from the scope and intent of the subject invention. For example, the apertures may define through openings that extend completely through the second end member. This alternate arrangement would require use of fastener members such as nuts for receipt on the threaded ends of the tie bolts. The inner face of the second end member matingly engages with the central body portion 12, particularly the seal member 48 and seat assembly 44.

The second end member 16 includes a flow passage 104 defined by intersecting branch passages 106, 108, 110. Branch passages 106, 108 are generally coaxial and the third branch passage 110 extends generally perpendicular therefrom. The third branch passage communicates with the valve chamber 28 at one end and with the branch passages 106, 108 at the other end. The first and second branch passages, in turn, are generally aligned with the flow path of the main process line and intersect faces 112, 114 of the end member. The faces 112, 114 are generally parallel to one another and preferably extend in perpendicular relation from the inner face 98 and external wall 100.

In order to facilitate receipt of the second end member directly into the process line, the first and second branch passages include means for sealingly joining the process line therein. In the preferred embodiment, threaded regions 116, 118 are adapted to receive the main process line therein. In this manner, flow through the main process line continues uninterrupted through the branch passages 106, 108 of the valve A'. Fluid communication between the secondary line C' and the main process line is completed through selective actuation of the valve A'.

Incorporation of an integral tee fitting directly into a valve body portion such as the second end member 16 offers a number of advantages over prior art constructions. As noted above, the intermediate fluid line 80 and tee fitting 70 are eliminated. This offers the benefits of two less connections or junctions in the fluid system; namely, the (i) interconnection of the intermediate fluid line with the tee fitting at one end and (ii) the valve body at the other end. Reducing the number of junctions correspondingly reduces the number of potential leak paths in the fluid system. Still further, since space is often at a premium, the valve body A' is brought much closer to the main process line when compared to prior, known arrangements as typified by valve A in FIG. 2A.

The invention has been described with reference to the preferred embodiment. Obviously modifications and alterations will occur to others upon a reading and understanding of the specification. For example, in the preferred arrangement a three part body is utilized to maintain the swing out arrangement. It will be understood by one of ordinary skill in the art that the modified end member can be used as the inlet end member in particular circumstances, or both end members can be modified if desired. This invention is intended to include all such modifications and alterations insofar as they come within the scope of the appended claims or the equivalents thereof.

Having thus described the invention, it is now claimed:

1. A valve comprising:
   a body having a central body portion and first and second end members disposed on opposite ends of said central body portion;
   means for securing said first and second end members to said central body portion;
   a chamber defined in said body;
   a valve member received in said chamber for selective movement between open and closed positions;
   said first end member abuttingly engaging said central body portion, said first end member including a first passage therein communicating with said chamber and a second passage disposed generally perpendicular to and communicating with said first passage, said second passage adapted for communication with an associated fluid line; and,
   said second end member including a third passage therein communicating with said chamber.

2. The valve as defined in claim 1 wherein said first end member includes a fourth passage generally colinear with said second passage for defining a tee junction therein.

3. The valve as defined in claim 2 wherein said first end member includes means associated with said second and fourth passages for connecting said first end member to an associated fluid line.

4. The valve as defined in claim 3 wherein said connecting means is defined by threaded portions in said second and fourth passages.

5. The valve as defined in claim 1 wherein said first end member includes first, second, third, and fourth apertures for receiving respective fasteners therein.

6. The valve as defined in claim 5 wherein said apertures are threaded.

7. The valve as defined in claim 5 wherein said apertures define through openings.

8. A valve comprising:
   a body including first and second end members disposed on opposite ends of a central body portion;
   means for securing said first and second end members to said central body portion;
   a chamber defined in said central body portion;
   a valve member received in said chamber for selective movement between open and closed positions;
   said first end member abuttingly engaging said body along a first face thereof, said first end member including a first passage therein communicating with said chamber, and second and third passages therein disposed generally perpendicular to said first passage and communicating therewith to define an integral tee in said body, said second and third passages adapted for communication with an associated fluid line; and
   said second end member including a fourth passage therein communicating with said chamber.

9. The valve as defined in claim 8 wherein said second and third passages are generally colinear.

10. The valve as defined in claim 8 wherein said second and third passages include means for connecting said first end member to an associated fluid line.

11. The valve as defined in claim 10 wherein said connecting means includes threaded portions defined in said second and third passages.

12. The valve as defined in claim 8 wherein said securing means includes means for pivoting said central body portion relative to said end members.

13. The valve as defined in claim 8 wherein said first end member includes first, second, third, and fourth apertures for receiving respective fasteners therein.

14. The valve as defined in claim 13 wherein said apertures are threaded.

15. The valve as defined in claim 13 wherein said apertures define through openings.

16. A valve comprising:
   a body having a central portion and first and second end members disposed on opposite ends of said central body portion;
   means for securing said first and second end members to said central body portion;
   a chamber defined in said body;
   a valve member received in said chamber and adapted for selective movement between open and closed positions;
   said first end member having first, second, third, and fourth faces, said first face matingly engaging the central body portion, said first end member including a first passage extending from said first face toward said fourth face but terminating short thereof, said first passage communicating with a second passage disposed generally perpendicularly thereto for defining an integral tee in said body, said second passage intersecting said second and third faces of the first end member which are generally parallel to one another and generally perpendicular to said first and fourth faces; and,
   said second end member including a fourth passage therein communicating with said chamber.

17. The valve as defined in claim 16 wherein said securing means operatively engages said first and second end members for compressing engagement on said opposite ends of said central portion.

18. The valve as defined in claim 16 wherein said first end member is of unitary construction.

19. The valve as defined in claim 16 wherein said securing means includes first, second, third, and fourth apertures in said first end member for receiving respective fasteners therein.

20. The valve as defined in claim 19 wherein said apertures are threaded.

21. The valve as defined in claim 19 wherein said apertures define through openings.

* * * * *